United States Patent Office 3,077,489
Patented Feb. 12, 1963

---

3,077,489
CYCLOOCTATETRAENE-METAL-TRICARBONYL COMPOUNDS
Kryn G. Ihrman, Farmington, Mich., and Thomas H. Coffield, Heidelberg, Germany, assignors to Ethyl Corporation, New York, N.Y., a corporation of Delaware
No Drawing. Filed Feb. 18, 1960, Ser. No. 9,439
10 Claims. (Cl. 260—439)

This invention relates to novel organometallic compounds and their mode of preparation. More specifically, this invention relates to cyclooctatetraene-metal-tricarbonyl compounds of the iron-group metals, i.e., iron, ruthenium and osmium wherein the metal is bonded to a cyclooctatetraene molecular species and in addition is bonded to three carbonyl groups.

It is an object of this invention to provide a novel class of cyclooctatetraene-metal-tricarbonyl compounds of iron, ruthenium and osmium and also the hydrogenation products thereof. A further object is to provide a process for the preparation of these compounds. Additional objects of this invention will become apparent from a reading of the specification and claims which follow.

The objects of this invention are accomplished by providing compounds represented by the following formula $$Q_z(CO)_3$$

wherein Q is a cyclooctatetraene molecular species, M is an iron-group transition metal, i.e., iron, ruthenium or osmium, and z is 1 or 2. In the above formula, the cyclooctatetraene molecular species represented by $Q_z$ where z is one or two donates four electrons to the metal atom, M, for bonding, and each carbonyl group donates two electrons to the metal for bonding. By virtue of the electrons donated to the metal atom, it achieves the electron configuration of the next higher inert gas above the metal atom, M, in the periodic table.

Our compounds are prepared by reacting a cyclooctatetraene compound, denoted in the previous paragraph as $Q_z$ with a carbonyl compound of a metal of the iron-sub group, i.e., iron, ruthenium and osmium. The cyclooctatetraene reactant, Q, has the formula as follows

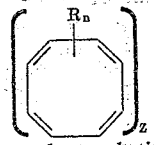

in which R is a monovalent substituent group, x is an integer ranging from zero to eight and z is one or two. The positions on the cyclooctatetraene group, which are not occupied by the monovalent substituent group R, are occupied by hydrogen atoms. Thus, when x is zero, there are eight hydrogens substituted on the cyclooctatetraene ring; this is the parent compound cyclooctatetraene. R, as previously defined, is a monovalent substituent group which contains up to about 10 carbon atoms and can be, for example, an alkyl, halogen, aryl, alkaryl, aralkyl, alkenyl, cycloalkenyl, or a cycloalkyl radical. Preferably, the total number of carbon atoms present in all of the R substituent groups does not exceed 20 carbon atoms.

When z is two, in the preceding formula, it indicates that two cyclooctatetraene molecules have condensed to give a structure which is visualized as having the following formula

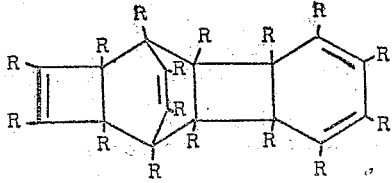

in which R has the meaning previously set forth. When the cyclooctatetraene molecule is cyclooctatetraene itself, this "dimer" has the formula $C_{16}H_{16}$.

The iron sub-group metal-carbonyl compound employed in forming our compounds is a non-ionic organometallic compound containing at least three carbonyl groups in the molecule which are bonded to the iron-sub group metal atom. More preferably, in the metal carbonyl reactant only carbon atoms or other iron-sub group metal atoms are bonded to the metal atom in the molecule. Typical of the metal carbonyl reactants which may be employed are the simple metal carbonyls such as iron pentacarbonyl, triiron dodecacarbonyl, osmium pentacarbonyl, ruthenium pentacarbonyl and the like. Also included are iron-sub group metal carbonyls in which an olefin is bonded to a metal tricarbonyl moiety. Typical of such compounds are butadiene iron tricarbonyl, cycloheptatriene iron tricarbonyl, cyclohexadiene iron tricarbonyl, bicycloheptadiene iron tricarbonyl, cyclopentadienone iron tricarbonyl, tetraphenylcyclopentadienone iron tricarbonyl, duroquinone iron tricarbonyl, octafluorocyclohexadiene iron tricarbonyl and the like. The preferred metal carbonyl reactants are the simple metal carbonyls which contain only a metal atom or atoms and a plurality of carbonyl groups.

The preferred compounds of our invention are those in which the metal M in the preceding formula is iron. These compounds are preferred since they are, in general, more stable than other of our compounds containing ruthenium or osmium. In addition, iron is more readily available than ruthenium or osmium, and those of our compounds containing iron are cheaper to prepare.

Typical of the compounds of our invention are cyclooctatetraene iron tricarbonyl, dicyclooctatetraene iron tricarbonyl, cyclopropenylcyclooctatetraene iron tricarbonyl, dichlorocyclooctatetraene osmium tricarbonyl, 1,2,3,4,5-pentabutyl-cyclooctatetraene ruthenium tricarbonyl, phenyl-cyclooctatetraene iron tricarbonyl, 1,2,3,4,5,6,7,8-octamethylcyclooctatetraene osmium tricarbonyl, bis(benzylcyclooctatetraene)ruthenium tricarbonyl, bis(di-p-tolyl-cyclooctatetraene) iron tricarbonyl, bis(2-propenylcyclooctatetraene) osmium tricarbonyl, bis(cyclobutylcyclooctatetraene) ruthenium tricarbonyl, bis(trimethylcyclooctatetraene) iron tricarbonyl, and the like.

The compounds of our invention are produced by the reaction of a cyclooctatetraene compound with an iron-sub group metal tricarbonyl compound, both as defined above. In this reaction, the cyclooctatetraene compound displaces ligands such as carbon monoxide, butadiene, bicycloheptadiene, cycloheptatriene, cyclooctadiene or the like from the metal carbonyl reactant to form our compounds by replacement of the displaced ligand with the cyclooctatetraene compound.

In general, the process may be carried out at temperatures between about 75 to about 200° C. Preferably, however, temperatures in the range from about 100 to about 160° C. are employed since, within this range, relatively higher yields are obtained with a minimum of undesirable side reactions. The pressure under which the process is carried out is not critical. Preferably, however, the process is conducted at atmospheric pressure or slightly higher although pressures up to 500 atmospheres can be employed if desired.

The process is generally conducted under a blanketing atmosphere of an inert gas such as nitrogen, helium, argon and the like.

The process may be conducted in the presence of a non-reactive solvent. The nature of the solvent is not critical and in fact, the cyclooctatetraene reactant may be used in sufficient excess to serve as a reaction solvent.

Typical of reaction solvents which may be employed in our process are high boiling saturated hydrocarbons such as n-octane, n-decane, and other paraffinic hydrocarbons having up to about 20 carbon atoms such as eicosane, pentadecane, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyldisilane, and diethyldipropyldiphenyldisilane may also be employed. Other ester solvents are those derived from succinic, maleic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sebacate, di-(methylcyclohexyl) adipate and the like. Of these enumerated solvents, those which are preferred for use in the process are the high boiling ethers and saturated aliphatic hydrocarbons. All of the above solvents will not be suitable for all of the specific embodiments of the invention since certain of the metal carbonyl reactants are relatively insoluble in some of the above solvents. Thus, care should be used in selecting the specific solvent for the specific reaction.

The particular solvent employed in any embodiment of the process should be selected from those solvents having the requisite boiling and/or freezing point. Frequently the boiling point of the solvent is used to control the reaction temperature when the process is carried out at atmospheric pressure. In such cases, the reaction mixture is heated at reflux, and the reflux temperature is determined by the boiling point of the solvent. The ease of separating the product from the solvent depends on the degree of difference between the boiling and/or freezing points of the product and the solvent. If the product is a liquid having a boiling point close to that of the solvent, it is obvious that separation will be difficult. In order to avoid this, it is preferable to select a solvent whose normal boiling point varies by at least 25° C. from the normal boiling point of a liquid product. If, on the other hand, the product is a solid, it is desirable that the freezing point of the solvent be at least 25° less than the temperature at which separation of the product is effected through crystallization. Obviously, if the solvent freezes before the solid product precipitates, it will be impossible to make a separation through crystallization.

The above criteria, as to physical properties of the solvent, are not unique to this process. In any chemical process, it is necessary to pick a solvent whose physical properties make it readily separable from the product being formed. It is deemed, therefore, within the skill of the art to select the most suitable solvent for use in any particular embodiment of the process of the invention.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, a time period from about 30 minutes to about 24 hours is sufficient.

In some cases, the process is advantageously carried out in the presence of an ultraviolet light source. This tends to decrease the reaction time and give a higher yield of product.

In many cases the metal carbonyl reactant employed in the process is more expensive than the cyclooctatetraene reactant. In order to insure maximum conversion of the metal carbonyl, it is, therefore, preferred in those cases to use excess quantities of the cyclooctatetraene. Generally, from about one to about 10 moles of the cyclooctatetraene compound are employed for each mole of the metal carbonyl reactant since, within this range, a good conversion of the metal carbonyl is obtained. In other cases, the cyclooctatetraene is more expensive than the particular metal carbonyl employed. In these instances, excess metal carbonyl reactant is employed to insure complete conversion of the cyclooctatetraene compound.

In some cases, hydroquinone or other free radical reaction inhibitors can be employed in the reaction, if desired, to prevent polymerization of the cyclooctatetraene reactant. Their presence is not critical, however, to the success of the reaction. Typical of other applicable free radical inhibitors are p-tert-butyl catechol, p-hydroxy anisole, 4-amino-1-naphthol, chloranil, 2,4-dinitro-chlorobenzene, dithiocarbamate and the like.

To further illustrate the compounds of the invention and their mode of preparation, there are presented the following examples in which all parts and percentages are by weight unless otherwise indicated.

*Example I*

A mixture comprising 20.8 parts of cyclooctatetraene and a trace of hydroquinone was heated at reflux under nitrogen while 19.6 parts of iron pentacarbonyl was added slowly over a six hour period. Refluxing was continued for an additional 12.5 hours. During the refluxing, gas evolution was observed, and the volume of gas which was evolved was approximately 82 percent of that expected from a displacement of two carbonyl groups from the iron pentacarbonyl by the cyclooctatetraene. The reaction mixture was left to stand overnight, and crystallization occurred. Recrystallization from isooctane followed by filtration yielded 10 parts of brown plates which were identified as cyclooctatetraene iron tricarbonyl. The infrared spectrum of this compound showed carbon-hydrogen stretching at 3.3 microns and metallocarbonyl bands at 4.9 and 5.07 microns. Analysis: found; C, 54.6; H, 3.38; Fe, 23.1; Calculated for $C_{11}H_8FeO_3$: C, 54.2; H, 3.28; Fe, 22.9.

The filtrate was reduced in volume by heating in vacuo and was cooled to 0° C. Filtration yielded an orange residue which on sublimation at two mm. Hg and 50° C. yielded one additional part of cyclooctatetraene iron tricarbonyl. The sublimation residue was extracted with hot isooctane. Yellow crystals were collected by filtration and recrystallized from ethanol to yield one part of dicyclooctatetraene iron tricarbonyl as yellow needles having a melting point of 109–111° C. The infrared spectrum of the compound showed carbon-hydrogen stretching at 3.3 and 3.4 microns and metallocarbonyl bands at 4.9 and 5.07 microns. Calculated for $C_{19}H_{16}FeO_3$: C, 65.5; H, 4.6; Fe, 16.1. Found: C, 65.7; H, 4.8; Fe, 15.9 percent.

*Example II*

A mixture comprising 10 parts of cyclooctatetraene and about 36.8 parts of iron pentacarbonyl under nitrogen was placed in the presence of sunlight for 24 hours. Slow gas evolution was noted and red crystals sublimed onto the side of the reaction vessel. The unreacted starting materials were distilled from the resulting mixture by heating in vacuo which left a black residue. Sublimation of the residue at 2 mm. Hg and 30° C. yielded 1.25 parts of red crystals having a rhombic crystalline structure and a melting point of 93–94° C. These crystals were identified as cyclooctatetraene iron tricarbonyl by means of a mixed melting point determination with authentic cyclooctatetraene iron tricarbonyl prepared as in Example I.

*Example III*

A mixture of 0.05 mole of triiron dodecacarbonyl and 0.2 mole of benzylcyclooctatetraene is stirred and heated at reflux in an inert atmosphere for 30 minutes. During this time, a copious evolution of gas is noted. The reddish-brown solution is cooled, filtered, and the filtrate is distilled. On fractionation of the distillate, a good yield of benzylcyclooctatetraene iron tricarbonyl is obtained.

Example IV

A solution is formed by dissolving 0.1 mole of 1-methylcyclooctatetraene and 0.5 mole of butadiene iron tricarbonyl in diethylene glycol dimethyl ether. The solution is heated at reflux for six hours under nitrogen after which it is filtered, and solvent is removed by heating under vacuum. The residue is dissolved in low-boiling petroleum ether and chromatographed on alumina. The product band is then heated in vacuo to give a good yield of methylcyclooctatetraene iron tricarbonyl.

Example V

To a solution of 0.5 mole of osmium pentacarbonyl in n-nonane is added five moles of p-butylphenyl-cyclooctatetraene. The mixture is heated at reflux for 10 hours under nitrogen after which the reaction product is discharged from the reaction vessel and filtered. Excess solvent is removed from the filtrate by heating under vacuum, and the residue is dissolved in low-boiling petroleum ether and chromatographed on alumina. The eluate is heated in vacuo to remove the petroleum ether and give a good yield of p-tolylcyclooctatetraene osmium tricarbonyl.

Example VI

Three tenth mole of ruthenium pentacarbonyl and 0.45 mole of 1,2,3,5,6-pentabutylcyclooctatetraene are dissolved in diethyladipate, and the solution is heated at reflux under nitrogen for two hours. The reaction product is then filtered, and solvent is removed from the filtrate by heating in vacuo. The residue is dissolved in low-boiling petroleum ether and chromatographed on alumina. On removing the solvent from the eluate by heating under vacuum, there is obtained 1,2,3,5,6-pentabutylcyclooctatetraene ruthenium tricarbonyl.

Example VII

A solution is formed by dissolving 0.25 mole of [2.2.1]-bicyclohepta-2,5-diene iron tricarbonyl and 0.25 mole of chlorocyclooctatetraene in diethylene glycol dimethyl ether. The solution is heated at reflux for five hours under nitrogen. It is then filtered, and solvent is removed in vacuo. There is obtained from the residue, by means of chromatographic separation as in the previous examples, a good yield of chlorocyclooctatetraene iron tricarbonyl.

A further aspect of our invention is the preparation of hydrogenated compounds from our compounds having the formula $Q_zM(CO)_3$ as described on the first page. In the case where $z$ is one, the hydrogenated product is formed by the reaction of one mole of hydrogen with one mole of a cyclooctatetraene-iron sub group metal-tricarbonyl compound having the formula $QM(CO)_3$. In the case where $z$ is two, the hydrogenated compound is formed by reacting two moles of hydrogen with each mole of a dicyclooctatetraene-iron sub group metal-tricarbonyl compound having the formula $Q_2M(CO)_3$.

Thus, the compounds of our invention include compounds selected from the group consisting of compounds having the formula $QM(CO)_3$ and the dihydrocyclooctatetraene-iron sub group-tricarbonyl hydrogenation products thereof, and compounds having the formula $Q_2M(CO)_3$ and the tetrahydrodicyclooctatetraene-iron sub group metal-tricarbonyl derivatives thereof.

Our hydrogenation process may be carried out under mild conditions utilizing hydrogen at low pressure, a Raney nickel catalyst and one of our compounds $Q_zM(CO)_3$ in a neutral solvent, both as previously defined. To illustrate this process, there are presented the following examples in which all parts and percentages are by weight unless otherwise indicated.

Example VIII

A mixture comprising 0.5 part of cyclooctatetraene iron tricarbonyl, as prepared in the previous example, 19.7 parts of ethanol and one part of Raney nickel was placed in a hydrogenation apparatus. At room temperature and atmospheric pressure, a takeup of about 0.0045 part of hydrogen was noted over a 1.5 hour period. The resulting mixture was filtered, and the filtrate was placed in vacuo to distill off the ethanol. The residual oil from the distillation was chromatographed through alumina using petroleum ether having a boiling point of 30–40° C. as the eluant. A yellow band appeared in the column and was collected. The solvent was distilled off from the yellow eluate in vacuo leaving a yelow oil which was identified as dihydrocyclooctatetraene iron tricarbonyl. The oil could not be crystallized at room temperature. The oil was rechromatographed, as above, and analyzed. Calculated for $C_{11}H_{10}FeO_3$: C, 53.7; H, 4.07. Found: C, 54.3; H, 4.28 percent.

Example IX

A mixture comprising 0.2 part of dicyclooctatetraene iron tricarbonyl as prepared in Example I, 0.5 part of Raney nickel and 19.7 parts of ethanol was placed in a hydrogenation apparatus. At room temperature and atmospheric pressure, a takeup of about 0.00225 part of hydrogen was noted over a one hour period. The resulting mixture was filtered, and the filtrate was heated in vacuo to distill off the ethanol. The remaining residue from the distillation was recrystallized twice from ethanol yielding tetrahydrodicyclooctatetraene iron tricarbonyl which was obtained as yellow needles having a melting point of 110–112° C. On analysis, there was found: C, 64.9; H, 5.53. Calculated for $C_{19}H_{20}FeO_3$: C, 64.8; H, 5.7 percent.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate and the like.

The compounds of our invention have further utility as additives to residual and distillate fuel generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operation.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of cyclo-octatetraene iron tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility of our compounds is their use as chemical intermediates in the preparation of metal-containing polymeric materials or in the preparation of new organic materials.

Having fully defined the novel compounds of our invention, their novel mode of preparation and their many utilities, we desire to be limited only within the lawful scope of the appended claims.

We claim:

1. Organometallic compounds selected from the group consisting of those having the formula $QM(CO)_3$ wherein Q is a cyclo-octatetraene molecular species and M is an iron-group transition metal, and the dihydrocyclooctatetraene-iron group transition metal-tricarbonyl derivatives of said $QM(CO)_3$ compounds and compounds represented by the formula $Q_2M(CO)_3$ wherein $Q_2$ is a dicyclo-octatetraene molecular species and M is an iron-group transition metal, and the tetrahydrodicyclooctatetraene-iron group transition metal-tricarbonyl derivatives of said $Q_2M(CO)_3$ compounds.

2. Cyclooctatetraene iron tricarbonyl.
3. Dicyclooctatetraene iron tricarbonyl.
4. Dihydrocyclooctatetraene iron tricarbonyl.
5. Tetrahydrodicyclooctatetraene iron tricarbonyl.
6. Organometallic compounds represented by the formula $Q_zM(CO)_3$ wherein Q is a cyclooctatetraene molecular species, M is an iron-group transition metal and z is an integer less than three.
7. Process comprising reacting
(A) a cyclooctatetraene compound having the formula

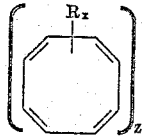

wherein R is a monovalent substituent group selected from the class consisting of halogen radicals and hydrocarbon groups having up to about 10 carbon atoms selected from the class consisting of alkyl, aryl, alkaryl, aralkyl, alkenyl and cycloalkenyl groups, $x$ is an integer ranging from zero to 8, such that the total number of carbon atoms present in the R substituents does not exceed about 20, and $z$ is an integer ranging from one to two, with (B) a non-ionic iron subgroup metal carbonyl compound selected from the class consisting of simple metal carbonyls having at least three carbonyl groups per metal atom and olefinic metal tricarbonyls wherein the olefin is selected from the class consisting of butadiene, cycloheptatriene, cyclohexadiene, bicycloheptadiene, cyclopentadienone, tetraphenyl cyclopentadienone, duroquinone, and octafluorocyclohexadiene.

8. The process of claim 7 wherein the metal carbonyl reactant contains iron.

9. The process of claim 7 wherein the metal carbonyl reactant is iron pentacarbonyl.

10. A process comprising reacting a compound having the formula $Q_zM(CO)_3$ wherein Q is a cyclooctatetraene molecular species, M is an iron group transition metal and $z$ is an integer less than three with hydrogen in the presence of a Raney nickel catalyst.

References Cited in the file of this patent

Manual et al.: Proceedings of the Chemical Society, p. 90, Mar. (1959).

Manual et al.: Jour. Amer. Chem. Soc., vol. 82, No. 2, pp. 366–372, Jan. 20, 1960.

Rausch et al.: Chemistry and Industry, page 957–958, No. 30, July 25, 1959.

Trifan et al.: Organic & Biological Chemistry, vol. 79, p. 2746, June 5, 1957.

UNITED STATES PATENT OFFICE
CERTIFICATE OF CORRECTION

Patent No. 3,077,489            February 12, 1963

Kryn G. Ihrman et al.

It is hereby certified that error appears in the above numbered patent requiring correction and that the said Letters Patent should read as corrected below.

Column 1, line 26, for "$Q_z(CO)_3$" read -- $Q_zM(CO)_3$ --; lines 43 to 48, for that portion of the formula reading "$R_n$" read -- $R_x$ --.

Signed and sealed this 11th day of February 1964.

(SEAL)
Attest:

ERNEST W. SWIDER

Attesting Officer

EDWIN L. REYNOLDS

Acting Commissioner of Patents